United States Patent Office 3,120,530
Patented Feb. 4, 1964

3,120,530
10-ALKYLAMIDOYOHIMBINE ESTERS
John Shavel, Jr., Mendham, N.J., assignor to Warner-Lambert Pharmaceutical Company, Morris Plains, N.J., a corporation of Delaware
No Drawing. Filed Sept. 6, 1961, Ser. No. 136,184
4 Claims. (Cl. 260—287)

The present invention relates to new and novel 10-alkylamidoyohimbine esters having the formula

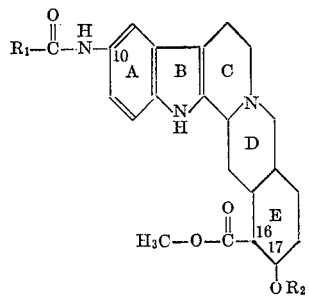

wherein $R_1$ is an alkyl group containing 1 to 5 carbon atoms and $R_2$ is the acyl radical of an aliphatic carboxylic acid containing 1 to 6 carbon atoms, benzoyl or benzoyl nuclearly substituted with 1, 2 or 3 lower alkyl, lower alkoxy or halo groups, and to the non-toxic pharmaceutically acceptable acid addition and quaternary ammonium salts thereof. This invention also relates to a new and novel method of preparing the above compounds and to intermediates obtained during the synthesis.

The new and novel compounds of this invention have interesting and significant pharmacological activity in inhibiting the effect of epinephrine and norepinephrine upon blood pressure. In addition, they are valuable intermediates in the production of other alkaloids of the yohimbane series.

The compounds of this invention bear the A, B, C, D and E rings as depicted in the above structural formula and are, generally, alkaloids of the yohimbane series. Depending upon the configuration of the hydrogen atom at the 3-position and the existence of cis or trans fusion of the D and E rings, four different configurations are possible, that is yohimbane, 3-epiyohimbane, alloyohimbane and 3-epialloyohimbane. The present invention includes within its scope derivatives of these four families of alkaloids bearing substituents at the 10, 16 and 17 positions as indicated in the above formula.

The starting materials for the production of the compounds of my invention are 10-acyl substituted alkaloids derivatives having the formula

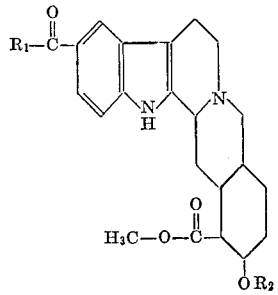

wherein $R_1$ and $R_2$ are as described hereinabove. Such starting materials are described in the copending application of John Shavel Jr., filed February 10, 1961 entitled "Alkaloid Derivatives of the Yohimbane Series and Process Therefor."

It has been found that starting materials of the above formula are converted to the compounds of this invention in a two step synthesis comprising, first, the reaction of the starting material with hydroxylamine to form the corresponding oxime followed by treatment of the oxime with trifluoroacetic acid. The oxime intermediates are new and novel compounds and are included within the scope of this invention.

The first step is the treatment of the starting material with hydroxylamine under reflux for about 1 to about 6 hours in the presence of an inert solvent system such as a mixture of pyridine and ethanol to form an oxime of the formula

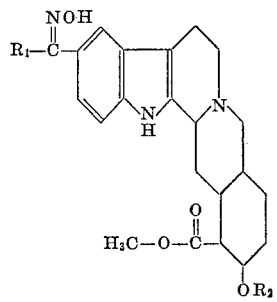

The hydroxylamine is normally added in the form of a salt such as the hydrochloride. Anhydrous conditions should be maintained during the reaction. The oxime separates as crystals from the reaction mixture and is recovered and recrystallized by conventional procedures.

The oxime intermediate is then refluxed with a substantial excess of trifluoroacetic acid, which also serves as a solvent in the reaction, until the reaction is complete, a procedure normally requiring about three hours, to form the amides of this invention having the formula

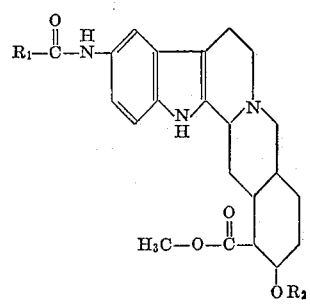

Recovery of the product is effected by pouring the reaction mixture onto crushed ice made basic with a dilute alkali such as ammonium hydroxide, followed by extraction with chloroform.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE 1

10-Acetylyohimbine Acetate Oxime

A solution of 50 g. 10-acetylyohimbine acetate, 30 g. hydroxylamine hydrochloride, and 130 ml. pyridine in 130 ml. absolute ethanol is refluxed for 1.5 hours and allowed to stand at room temperature. The white crystals which separate are collected, washed with ethanol, and dried in vacuo at 65° for four hours. Yield: 49.8 g.; M.P. 292–296° dec., $[\alpha]_D^{25}$ +89° (pyridine, c.=0.38). Recrystallization from ethanol gives the hydrochloride salt of 10-acetylyohimbine acetate oxime as a hemihydrate, M.P. 280–283° dec., $[\alpha]_D^{25}$+99° (pyridine, c.=1.00).

*Analysis.*—Calc.: C, 60.17; H, 6.67; N, 8.42. Found: C, 60.16; H, 6.73; N, 8.38.

EXAMPLE 2

10-Acetamidoyohimbine Acetate

A solution of 44.8 g. 10-acetylyohimbine acetate oxime hydrochloride in 200 ml. trifluoroacetic acid is refluxed for three hours. The solution is poured onto crushed ice, basified with ammonium hydroxide, extracted with chloroform, dried over sodium sulfate, and distilled in vacuo to dryness. The residue is dissolved in 250 ml. of 50% acetic acid and treated with excess saturated aqueous ammonium chloride solution. The white solid which separates is collected and recrystallized from water to give 37.3 g. of material, M.P. 287–289° dec., recrystallization from ethanol-water gives the hydrochloride salt of 10-acetamidoyohimbine acetate with 1.5 mols water, M.P. 279–284° dec., $[\alpha]_D^{25}$ +76° (methanol, c=0.45).

*Analysis.*—Calc.: C, 58.02; H, 6.82; N, 8.13. Found: C, 58.18; H, 6.71; N, 8.20.

In the foregoing examples, all temperatures are given in degrees centigrade.

It is understood that the foregoing detailed description is given merely by way of illustration and that many variations may be made therein without departing from the spirit of my invention.

Having described my invention, what I desire to secure by Letters Patent is:

1. A member selected from the group consisting of compounds of the formula

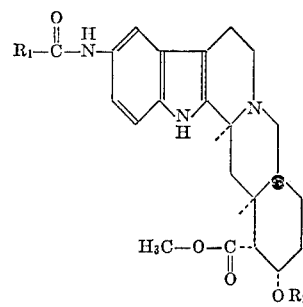

wherein $R_1$ is an alkyl group containing 1 to 5 carbon atoms and $R_2$ is a member selected from the group consisting of the acyl radical of an unsubstituted saturated aliphatic carboxylic acid of 1 to 6 carbon atoms, benzoyl and benzoyl nuclearly substituted with 1 to 3 members selected from the group consisting of lower alkyl, lower alkoxy and halo, and the pharmaceutically acceptable non-toxic acid addition thereof.

2. 10-acetamidoyohimbine acetate.

3. A compound of the formula

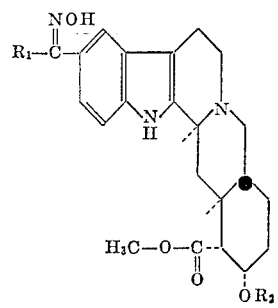

wherein $R_1$ is an alkyl group containing 1 to 5 carbon atoms and $R_2$ is a member selected from the group consisting of the acyl radical of an unsubstituted saturated aliphatic carboxylic acid of 1 to 6 carbon atoms, benzoyl and benzoyl nuclearly substituted with 1 to 3 members selected from the group consisting of lower alkyl, lower alkoxy and halo.

4. 10-acetylyohimbine acetate oxime.

References Cited in the file of this patent

Degering: Outline of Org. Nitrogen Compounds, Univ. Lithoprinters, Ypsilanti, Mich. (1950), pp. 176, 177 and 402.

Theilheimer: Syn. Meth. of Org. Chemistry, Interscience, New York, vol. 13 (1959), p. 113.